Dec. 31, 1940.　　　　F. Q. RAST　　　　2,226,980

STAMP ISSUING MACHINE

Filed Dec. 13, 1938　　　6 Sheets-Sheet 1

INVENTOR
FREDERICK Q. RAST
BY
ATTORNEY

Dec. 31, 1940.  F. Q. RAST  2,226,980
STAMP ISSUING MACHINE
Filed Dec. 13, 1938   6 Sheets-Sheet 3

INVENTOR
FREDERICK Q. RAST
BY
ATTORNEY

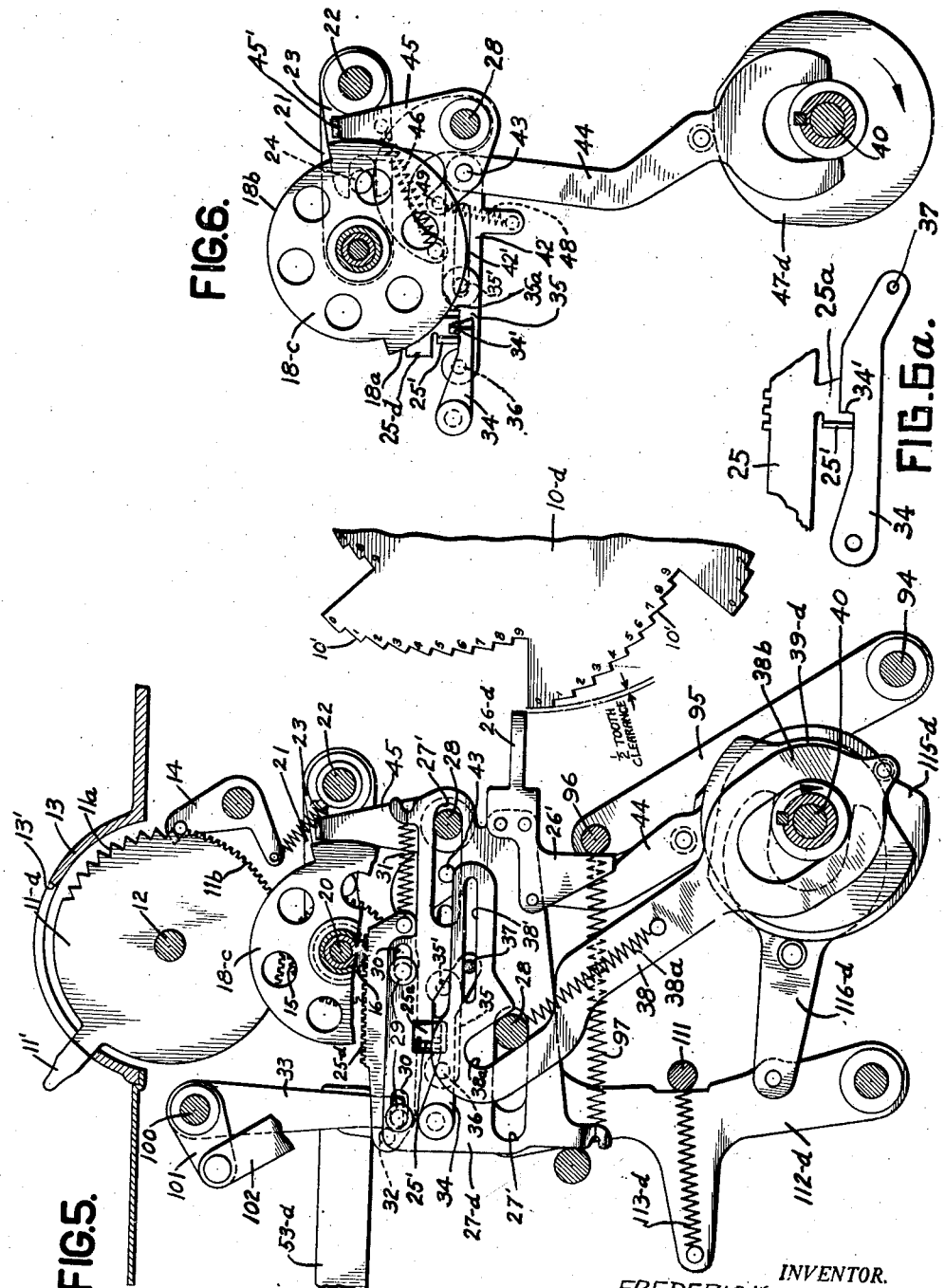

Dec. 31, 1940.  F. Q. RAST  2,226,980
STAMP ISSUING MACHINE
Filed Dec. 13, 1938  6 Sheets-Sheet 5
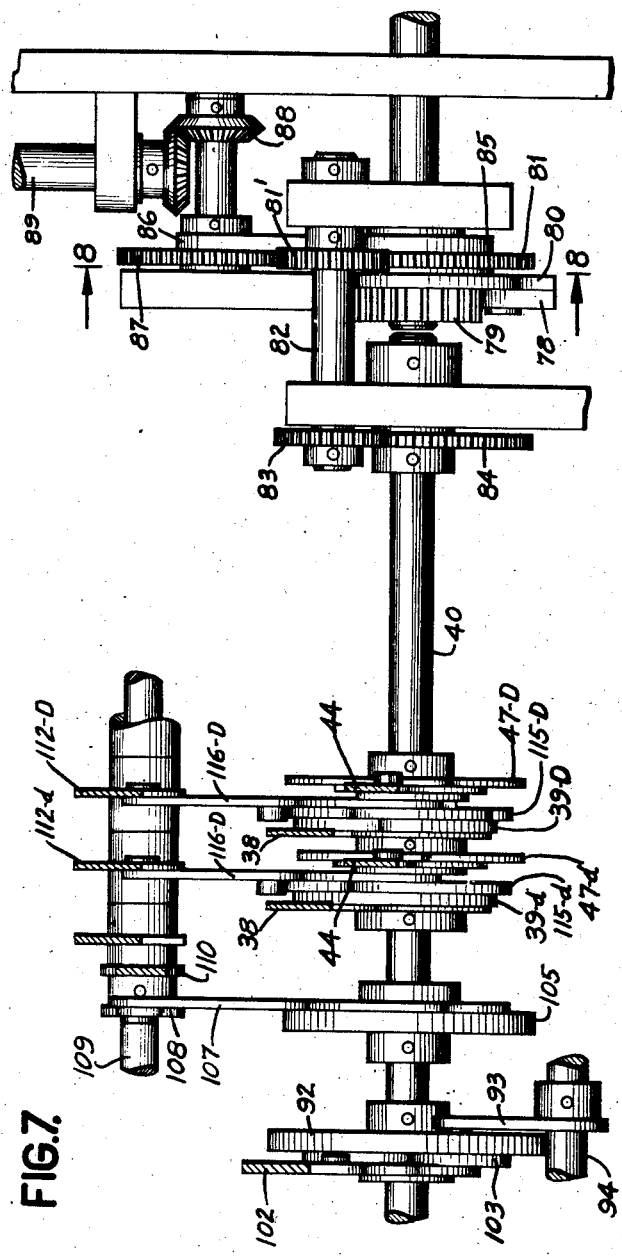
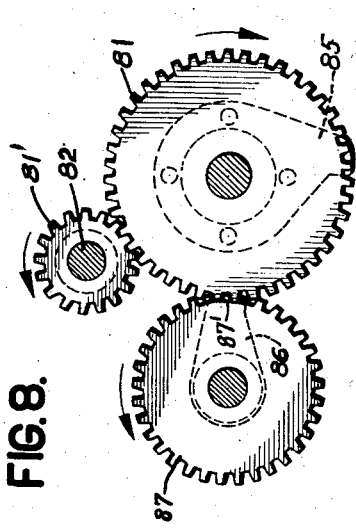
INVENTOR
FREDERICK Q. RAST
BY
ATTORNEY Dec. 31, 1940.  F. Q. RAST  2,226,980
STAMP ISSUING MACHINE
Filed Dec. 13, 1938  6 Sheets-Sheet 6

INVENTOR
FREDERICK Q. RAST
BY
ATTORNEY

Patented Dec. 31, 1940

2,226,980

UNITED STATES PATENT OFFICE 2,226,980

STAMP ISSUING MACHINE

Frederick Q. East, Binghamton, N. Y., assignor to International Business Machines Corporation, New York, N. Y., a corporation of New York Application December 13, 1938, Serial No. 245,405

6 Claims. (Cl. 235—61)

This case relates to postage printing and metering machines and is concerned with improvements on the machines disclosed in my previous Patents Nos. 2,111,128 and 2,120,373.

In the latter patent, a machine is disclosed for weighing a package to set selector means for selecting a postage value in accordance with weight and a selected postal zone. Under control of such selector means, devices are operated to control the printing of a postage stamp having the denomination selected by the selector means and for registering the value of such printed stamp. In Patent No. 2,111,128, a similar machine is disclosed, but in which is provided, in addition to the means for printing and registering a stamp value under control of the weight and zone selector means, supplementary means for alternatively, manually setting up a surcharge value for controlling the registration of the surcharge value and the printing of a surcharge stamp. Such surcharge may be a fee for insurance, registration, or the like, to be added to the parcel postage charge of the package. In the machine disclosed in Patent 2,111,128, the surcharge stamp and the parcel postage stamp are required to be separately issued and metered, since the surcharge device and the weight controlled device may operate only alternatively and one at a time.

According to the present invention, means are provided to print a single postage stamp and to register the value thereof under the combined control of surcharge means and the weight and zone controlled means. Thus, a single stamp is issued having a total value which is the sum of the surcharge value and the parcel postage value.

It is contemplated, nevertheless, that the present invention provides that, if desired, the surcharge value alone may be set up to cause the issue of a fee stamp bearing only the surcharge value, and that the machine may, if desired, issue a parcel postage stamp under control solely of the weight and zone selector means.

While the invention is concerned primarily with the provision of parcel postage and surcharge means in relation to parcel postage printing and metering means, it is also within the purview of the invention to provide means of general application for causing a plurality of denominational order sets of value selectors to control a device to compute the combined values selected by said selectors and, in accordance with the computation, control the indication, recording, and registration of the sum of the values selected by the different selectors. Stated another way, it is one of the objects to provide computing means controlled by a plurality of sets of value selectors for adding multi-denominational orders of values set up by the different selectors to provide a single computation of the sum of such values; and incidental to the addition of the multi-order values the invention provides novel transfer or carry-over means to transfer from one order to the next higher one. The invention thus aims to provide novel computing means controlled by a plurality of value selector units for adding the values set up by said selector units and combining such values into a single computation to control value manifesting means such as printing and registering means.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 is a section along lines 5—5 of Fig. 4,

Fig. 6 is a view of the portion of Fig. 5 showing the carry-over mechanism,

Figure 4:
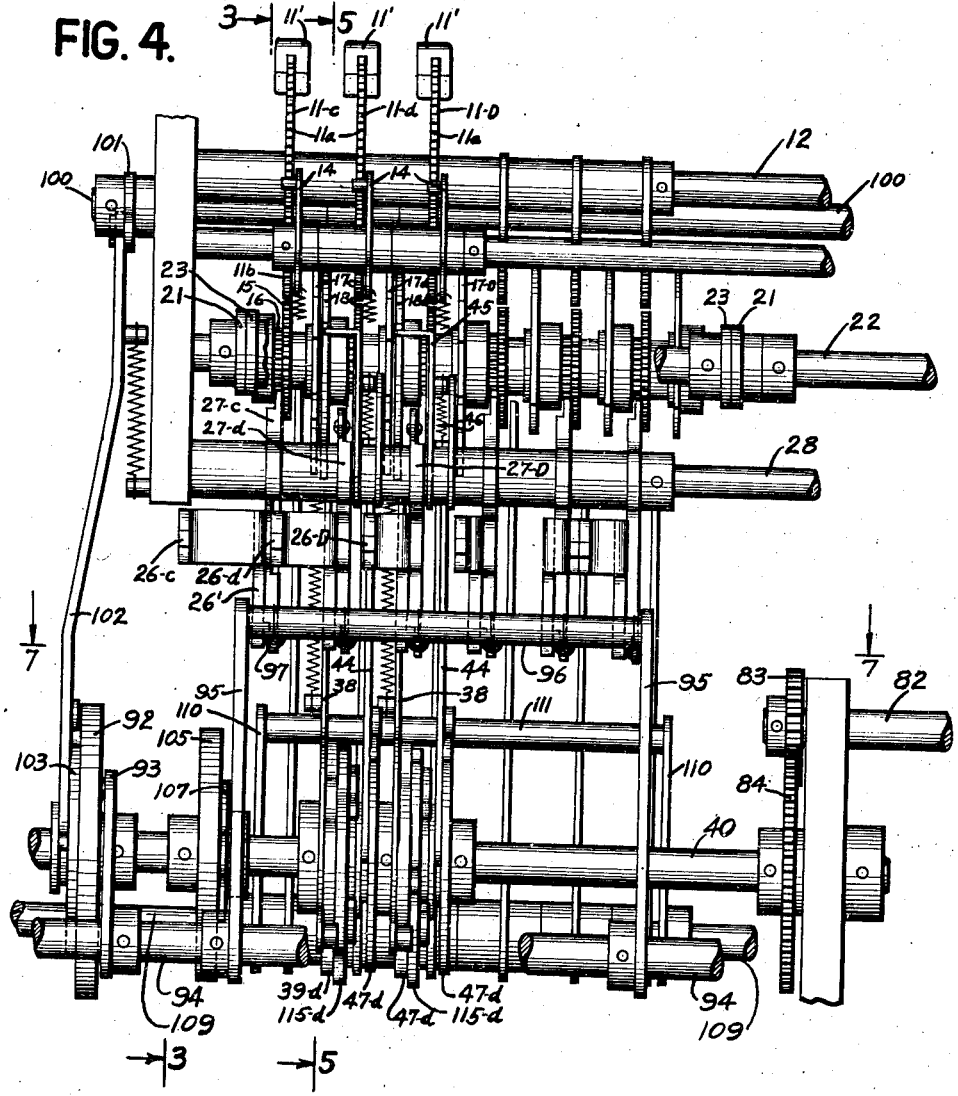
Fig. 4 is a section along lines 4—4 of Fig. 3.
Figure 14:
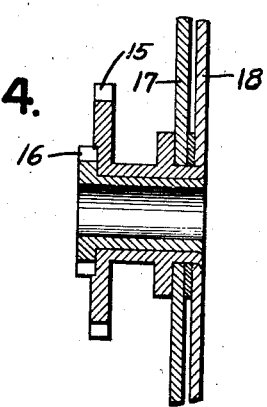
Figure 10:
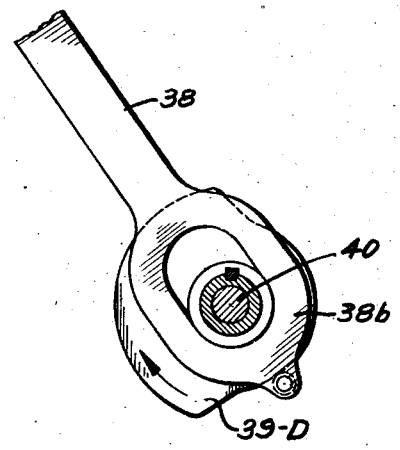
Figure 11:
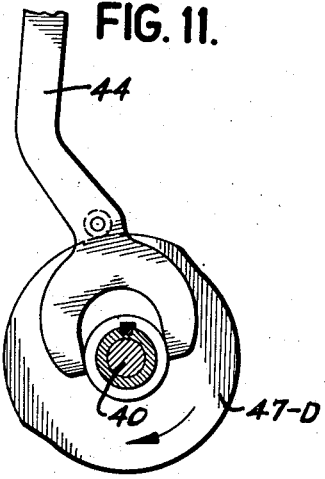
Figure 12:
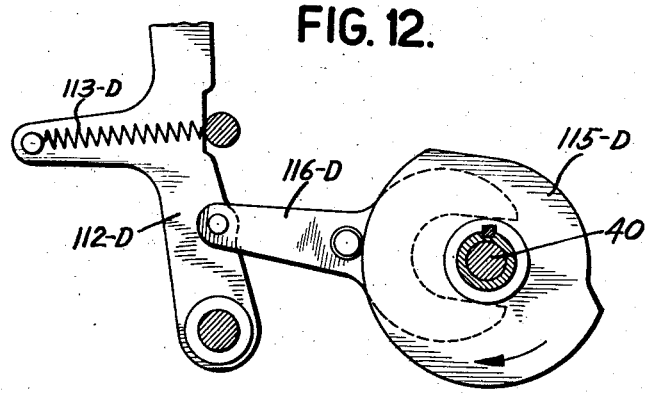
Figure 13:
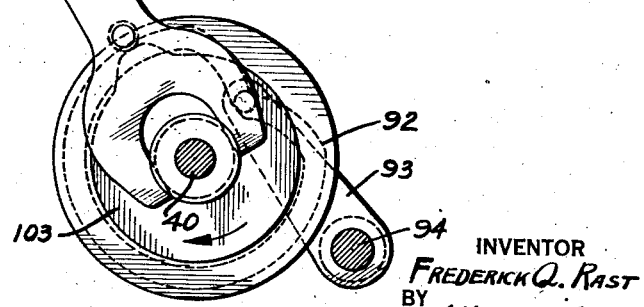

Fig. 6a is a detail view, showing one of the latches and the related transfer rack of the reading means, Fig. 7 is a section along lines 7—7 of Fig. 4, Fig. 8 is a section along lines 8—8 of Fig. 7, Fig. 9 is a detail perspective view of the rack on the reading means of the dimes and dollars order, Fig. 10 shows the dimes order carry-over latch cam mechanism, Fig. 11 shows the carry-over feeler cam mechanism of the dollars order, Fig. 12 illustrates the cam mechanism for the positioning arm of the dollars order, Fig. 13 shows the carry-over rack restoring cam and linkage, and Fig. 14 is a section through the intermediate sleeve assembly of the cents or dimes order of computing means.

As disclosed in my Patent 2,120,373, the machine includes a weighing unit (not shown here) which weighs the parcel to be mailed and in accordance with the weight automatically controls common rotation of stepped value selector disks to a position corresponding to the load. There are a plurality of sets of these selector disks mounted for common rotation and for axial adjustment. The axial adjustment is for the purpose of selecting one set of the selector disks for control purposes in accordance with the zone to which the package is to be mailed. This zone selection is effected by zone selecting means, disclosed in the abovementioned patent, before the selector disks are rotated to load position under control of the scale unit. Each set of stepped selector disks includes a dollars denominational order disk, a dimes order value disk, and a cents order disk. Similar elements of different denominational orders may be distinguished in accordance with the denominational order to which they belong by appending to their common reference character the letter D, d, or c, respectively indicating dollars, dimes and cents orders. For the purposes of the present invention only two disks 10—d (Fig. 5) and 10—c (Fig. 3) need be shown. It is also to be understood that the principles of the invention are applicable to machines in which elements such as disks 10 or the like may be set by means other than weighing mechanism and without regard to zone selection or the like.

Figure 3:
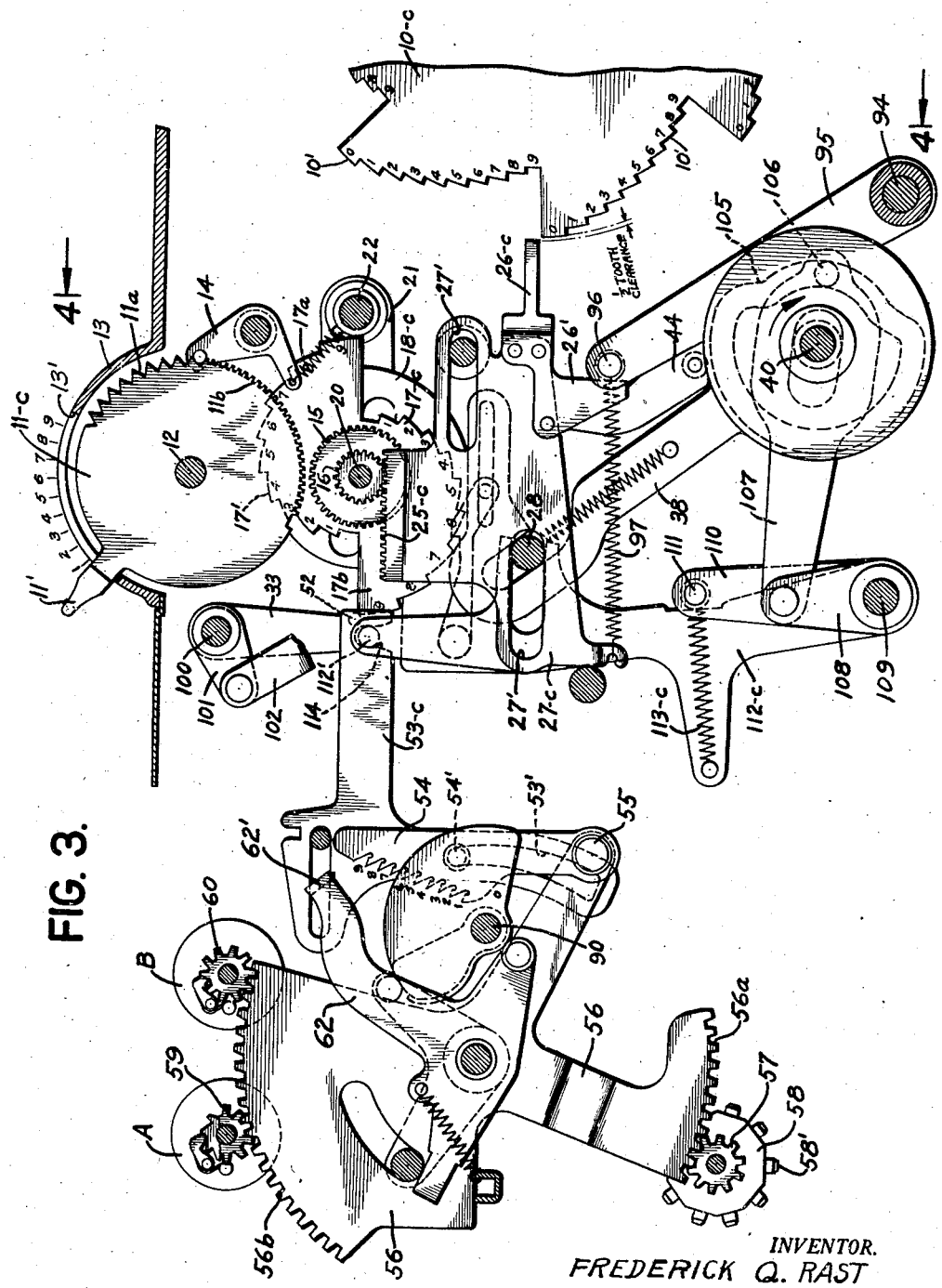
Fig. 3 is a section along lines 3—3 of Fig. 4.

Disks 10 are formed with steps 10' of different heights to represent the different values 0 to 9, the highest step being a 0 step, as indicated in Figs. 3 and 5. Each step of disk 10—c represents one of the 0 to 9 cents values, while each step of disk 10—d represents 0 to 9 in the dimes order.

In addition to the set of value selector disks 10, a supplementary set of value selecting means is provided, which in this particular case is intended to set up a surcharge value, such as the postal fee for registering or insuring the parcel to be mailed. The surcharge value selector means comprise three manually settable disks 11 (see Figs. 3, 4, and 6) rotatably mounted on a common rod 12, each disk being provided with a finger piece 11' extending through slots 13' in the casing 13. Alongside each slot, the value positions of a disk are designated by a set of figures 0 to 9, as shown in Fig. 5. There are three disks 11—D, 11—d, and 11—c to set up dollars, dimes, and cents surcharge values. To select a desired surcharge, the operator engages finger pieces 11' and moves the disks until the finger pieces are alongside the desired value indications. Each disk 11 is formed with a V-notched portion 11a for coacting with a retaining pawl 14 to retain the disk impositively in its selected position. Also formed on each disk 11 is a segmental gear portion 11b adapted to mesh with the teeth of a pinion 15. As indicated particularly in Fig. 14, pinion 15 is a rigid part of an intermediate sleeve assembly including a smaller pinion 16 and a stepped cam 17. There is one such assembly for each value order, but in addition to pinions 15 and 16 and stepped cam 17, the cents order and dimes order assemblies each include a transfer disk 18. Referring to Fig. 3, the cam 17 of each of the value orders is formed with diametrically opposite, similar, spirally stepped cam portions 17a and 17b, each such portion having ten steps 17' of different heights to represent the digital values 0 to 9, the highest step representing value 9. The intermediate sleeve assemblies are rotatably carried by a common rod 20 supported between the outer ends of bail arms 21 (see Figs. 3, 4, 5, and 6) which at their rear ends are rotatively carried by a shaft 22 (also see Fig. 1). To this shaft are fixed a pair of crank arms 23, the free ends of which are forked to receive studs 24 (see Fig. 6) of bail arms 21. When shaft 22 is in its clockwise position, then arms 23 are acting on arms 21 to hold rod 20 in raised position, in which pinions 15 are meshed with their associated segmental gear portions 11b of manually settable surcharge disks 11. This is the initial condition of the parts, so that when disks 11 are rotated to desired value positions, their portions 11b, acting through pinions 15, are effective to rotate the corresponding intermediate sleeve assemblies to positions representing the surcharge values. Thus, as a result of the surcharge setting, a step 17' of each cam portion 17a—such step corresponding to the selected surcharge value of the same value order—will be selected for control purposes.

After the surcharge setting has been effected, the intermediate sleeve assemblies are lowered, in a manner which will be explained later, by rocking the shaft 22 counterclockwise (as viewed in Figs. 3 and 5), thus demeshing pinions 15 from their associated segmental portions 11b of surcharge disks 11. The disks 11 are now ineffective to change the setting of cams 17. When the intermediate sleeve assemblies are lowered, the small pinions 16 move into mesh with associated racks 25—D, d, and c. The lengths of the teeth of elements 11b, 15, 16 and 25 are such that pinions 16 will engage racks 25 before pinions 15 completely leave teeth 11b, thus preventing any change in the setting of the intermediate sleeve assemblies during the shifting of control of the latter from the surcharge disks to the racks 25. The further actuation of the sleeve assemblies can now be effected only by movement of racks 25 which are parts of the reading means for reading disks 10. The movement of a rack 25 through a tooth distance causes rotation of the associated sleeve assembly through one value step. Differential movement of racks 25 is effected in accordance with operation of the means for reading the steps of weight and zone parcel postage selector disks 10.

The reading means for reading the steps of disks 10 comprise feelers 26 which are rigidly secured to the front ends of primary slides 27, mounted for horizontally slidable movement by means of slots 27' coacting with fixed guide rods 28. There is one primary slide 27 for each value order. The cents order slide has the cents order rack 25—c rigid therewith (see Fig. 3). The dimes and dollars order slides 27 slidably carry their respective racks 25—d and D (see Figs. 5 and 9), for a purpose which will be brought out later. To aid in differentiating movably mounted racks 25—d and D from rigidly carried rack 25—c, the racks 25—d and D may be referred to as the transfer racks, the effecting of a transfer movement being one of their functions. The transfer racks 25—D and d are similarly mounted in a manner which may be understood from Fig. 5, showing the dimes order. The transfer rack has a pair of headed guide studs 29 passing through horizontally elongated slots 30 of the primary slide 27—d. The length of each slot 30 is equal to two teeth of rack 25—d, so that the transfer rack may move forwardly relative to its primary slide for a maximum distance equal to two teeth. A spring 31 between the primary slide and the transfer rack tends constantly to move the rack forwardly relative to the slide. Initially, however, this action is blocked by engagement of a stud 32 on the rear end of the transfer rack with the front of a depending arm 33 (see Figs. 3 and 13).

Pivotally carried by each of the primary slides 27 of the dimes and dollars orders is a latch 34 formed with a shoulder 34' (Fig. 6), initially spaced in front of a tab 25' of the associated transfer rack for a distance equal to half a tooth of the rack. The tab 25' is a transversely bent portion of a lug 25a integrally dependent from the transfer rack, and the front, vertical edge of which is in the plane of a shoulder 35a of a transfer pawl 35 pivotally carried by the primary slide through a pivot stud 36. Initially, the distance between the shoulder 35a of pawl 35 and the front of lug 25a is a single, full tooth distance. Latch 34 is provided at its free end with a pin 37 movable along a horizontally elongated slot 38' of a lever 38, which follows a cam 39 on main cam shaft 40. The primary slide 27 is movable differentially in a horizontal direction to sense the value set-up of a selector disk 10, while follower lever 38 moves rectilinearly in an inclined direction, being guided for such movement by coaction of its upper slot 38a with a guide rod 28, and by coaction of its lower yoke portion 38b with a bushing on the main cam shaft 40. In order to permit horizontal movement of primary slide 27 relatively to follower lever 38, the latter is formed with the elongated slot 38' along which pin 37 of latch 34 may move together with the primary slide. Accordingly, in any position to which the primary slide 27 may be moved, carrying the latch 34 along with it, the pin 37 of the latch will be in coaction with slot 38' of lever 38.

During the machine cycle, each dependent arm 33 is first permitted to move to the right to enable the associated transfer rack 25 to advance under the impetus of spring 31. This advance is through half a tooth until the tab 25' engages the shoulder 34' of latch 34. The cam follower lever 38 is then moved downwardly by cam 39, against resistance of a spring 38a (see Fig. 5), and this action of lever 38, through coaction of slot 38' with pin 37, lowers latch 34 to withdraw shoulder 34' from tab 25', permitting spring 31 to move the transfer rack further for half a tooth distance until the front of lug 25a is stopped by shoulder 35a of transfer pawl 35.

Transfer pawl 35 is also bodily carried by the primary slide 27 by means of pivot stud 36 and, therefore, maintains the same horizontal position relative to the transfer rack and to latch 34 throughout the advance of the primary slide. The forward end of pawl 35 is provided with a stud 35' movable along a guide slot 42' of a link 42 (see Fig. 6) which is pivotally mounted on a pin 43, also serving to pivotally connect a follower lever 44 to the lower arm of a transfer cam feeler lever 45. The upper end of lever 45 is formed with a transversely bent lug 45' for engaging the periphery of the transfer cam 18 of the next lower order of the computing means. The transfer cam has two semi-circular lobes 18a and 18b, the former at a greater radius than the latter. During the movement of the said next lower order from "0" to "9", the higher lobe 18a is in front of lug 45', but upon further movement from the "9" to the next "0" ("10") position of the lower order, the lobe 18b comes in front of lug 45'. A spring 46 urges lever 45 counterclockwise (Fig. 6) to sense the periphery of transfer cam 18, but this movement is timed by a cam 47 on cam shaft 40 and which acts on cam follower lever 44 to time its descent and thereby to time the counterclockwise movement of lever 45. A spring 48 between the link 42 and a pin 49 on transfer lever 45 yieldingly maintains the upper edge of the link against the pin.

As the dimes or dollars slide 27 advances a differential amount, the transfer pawl 35 of the same order is carried along with its primary slide, and during this movement of the pawl 35, its pin 35' moves along slot 42' of link 42. When cam 47 permits lever 44 to descend, the transfer lever 45 rocks to cause its lug 45' to sense the periphery of transfer cam 18 of the next lower order. As lever 44 descends, pin 43 connecting this lever to link 42 moves down, and at the same time, as lever 45 rocks counterclockwise its pin 49 also moves downwardly and in conjunction with the descent of pivot 43 depresses the link 42 bodily. When link 42 is depressed, its slot 42' coacts with pin 35' of transfer pawl 35 to rock the pawl downwardly about its pivot 36. If the next lower order has not moved through its "9" to "0" position, the high lobe 18a of its transfer cam will stop counterclockwise rocking of lever 45 of the next higher order, thereby also arresting descent of the follower lever 44. Hence, link 42 will not be depressed sufficiently to lower pawl 35 the distance necessary to release pawl shoulder 35a from the lug 25a of the associated transfer rack. Consequently, the transfer rack will have moved only one tooth distance forwardly relative to its carrying slide 27, this distance including a half tooth advance of the rack upon its release by dependent arm 33, until tab 25' engaged shoulder 34' of latch 34, and another half tooth advance of the rack upon release of latch 34 from the tab 25' until the lug 25a engaged shoulder 35a. However, if the lower order has moved through the "9" to "0" positions, the lower lobe 18b of its transfer cam 18 will be in front of lug 45' of the transfer lever 45 of the next higher order. Consequently, when permitted by cam 47, the lever 45 will rock counterclockwise to its limit till lug 45' engaged the lower lobe 18b, causing followed 44 to descend to its limit. The extent of these movements is such as to cause link 42 to rock pawl 35 downwardly sufficiently to release its shoulder 35a from the path of advance of lug 25a of the transfer rack. As a result, spring 31 advances the transfer rack an additional full tooth distance relative to its primary slide 27 before the right hand ends of guide slots 30 of the primary slide engage the studs 29 of the rack to stop movement thereof. This additional one tooth movement of rack 25 is the transfer step resulting from the movement of the next lower order computing assembly through the "9" to "0" positions. As a consequence of this transfer step, the higher order intermediate sleeve assembly is rotated an additional step, bringing the next value step 17' of its cam 17 into control position.

Initially each reading finger 26 is spaced from the locus of the "0" step of parcel postage selector disks 10 a distance equal to half a tooth advance of a rack 25. The cents order rack is fixed to its primary slide 27 so that due to the half step advance of the slide necessary to bring the finger 26 into the locus of the "0" step 10' of disks 10, the cents order of intermediate sleeve assembly will be rotated half a step. Initially, the "0" step of cam 17a of the cents order is half a step behind the control position. Accordingly, the initial movement of the cents order of reading means merely brings the "0" step of cents order cam 17a to control position provided, however, that the cents surcharge set-up was zero. The dimes and dollar orders of racks 25 always have one tooth advance relative to their primary slides 27 each machine cycle and in addition move one half tooth step with their primary slides when the fingers 26 thereof advance to "0" positions, thus having a total take-up movement of one-and-a-half steps. The initial preliminary position of the "0" steps 17' of cams 17a of the dimes and dollars order is one-and-a-half steps behind the control positions, so that the advance of the intermediate sleeve assemblies of the dimes and dollars orders through one-and-a-half steps, which occurs each machine cycle, merely brings the "0" steps 17' of cams 17a to control positions, provided, however, that the dimes and dollars surcharge set-up was zero. If the surcharge set-up of any order is above zero, the step 17' corresponding to the selected surcharge value will be behind the control position, one-half step if in the cents order and one-and-a-half steps if in either the dimes or dollar order.

The stepped cams 17 of the several orders of the intermediate sleeve assemblies of the computing means control corresponding orders of value printing and registering means of a removable meter. The construction and operation of this meter are fully explained in my aforementioned Patent No. 2,120,373, and only such parts as are required for an understanding of the present invention will be explained herein.

The control position of a cam step 17' of cam 17 of a value order is its position directly in front of a stud 52 of a corresponding order of meter slide 53. During the main cycle (see Fig. 2), each slide 53 is advanced to engage its stud 52 with the cam step 17' in control position, thereby arresting the slides 53 after a differential movement inversely proportional in extent to the value of the controlling cam step. As slide 53 advances, its slot 53' coacts with a pin 54' of a stepped arm 54 to rock the latter a corresponding angular amount on a pivot pin 55. Arm 54 is bodily carried, through said pivot pin 55 by a carrying member 56. Member 56 has a lower gear sector 56a meshed with a pinion 57 on a type wheel 58 bearing types 58'. An upper gear sector 56b of member 56 meshes with pinions 59 and 60 of ascending and descending registers A and B.

Arm 54 has nine steps "9" to "1" as indicated in Fig. 3. In accordance with the differential advance of meter slide 53, the stepped arm will be angularly positioned to place a corresponding value step 54' in the path of a lug 62' of an actuating arm 62. During the meter cycle, arm 62 comes down, its lug 62' engages the step 54' in its path and thereafter to the end of the down stroke forces the arm 54 downwardly, thereby effecting clockwise rocking of carrying member 56. The member 56, through coaction of its gear sector 56a with pinion 57, rotates the type wheel 58 to set, at the printing position, the type element 58' corresponding to the value read out of the computing assembly. During the return stroke of member 56, the type wheel is restored, while upper gear sector 56b actuates pinions 59 and 60, which through ratchet means 61, enter the value which has been printed into ascending and descending registers A and B.

Assuming the machine is to operate for computing printing, and registering a postage charge which includes a surcharge fee as well as the parcel postage fee for a parcel, there are three preliminary steps to be taken by the operator. These are; one, to effect a zone selection for setting the value disks 10 of a desired zone in front of reading fingers or feelers 26; two, to apply the parcel to the scale unit, causing the weighing mechanism to operate in accordance with the weight of the package; and three, to effect the surcharge setting by moving surcharge disks to positions corresponding to the surcharge value. These three steps may be performed in any desired order.

Figure 1:
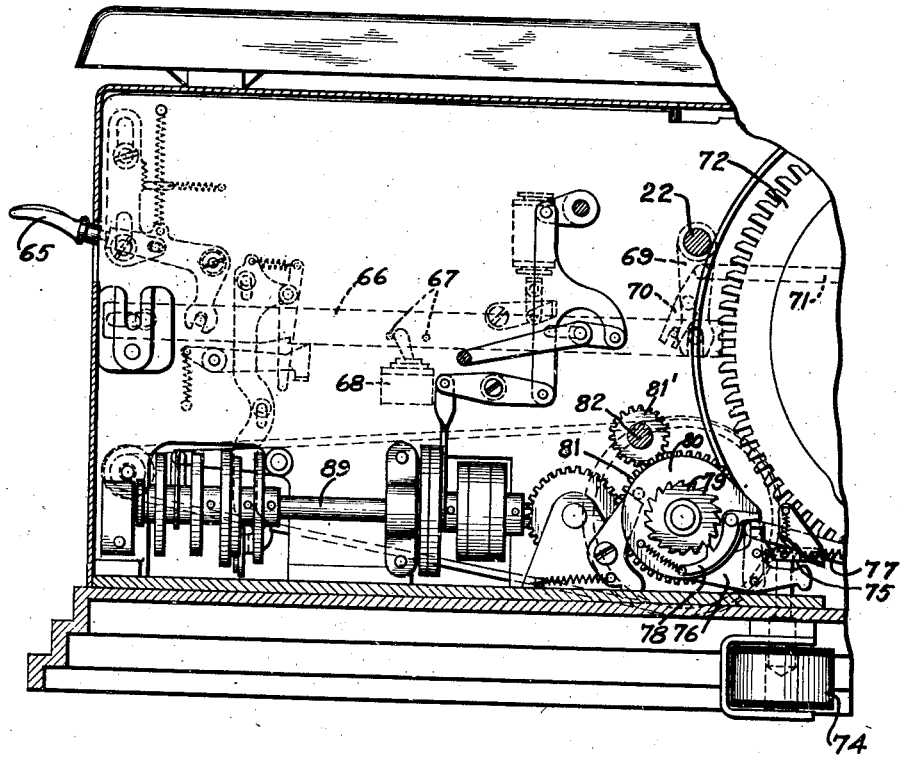
Fig. 1 is a sectional elevation through a portion of the machine.

Having selected the zone, set the surcharge disks 11, and applied the parcel to the scale unit, the operator waits until the scale comes to rest under the load, and then depresses an operating handle 65 (Fig. 1). The depression of handle 65 advances a slide bar 66 which has studs 67, the rear one of which closes a toggle switch 68 upon advance of the slide bar while the leading pin 67 opens the switch upon restoration of the slide bar. As bar 66 is now advanced, the switch 68 is closed setting a motor (not shown) in operation. The forward end of the slide bar 66 is pivotally connected to a crank arm 69 rigidly dependent from the shaft 22, and when bar 66 is advanced, it acts through arm 69 to rock the shaft 22 counterclockwise. Accordingly, arms 23 (see Figs. 4, 5, and 6) of shaft 22, by coaction with studs 24, rock the bail arms 21, the shaft 20 supported thereby, and the sleeve assemblies on the shaft 20, downwardly. This demeshes pinions 15 of the intermediate sleeve assemblies from gear teeth 11b of the settable surcharge disks 11, and meshes the small pinion 16 with the racks 25 of the reading assemblies. The arrangement and size of the pinions, gear teeth, and racks are such as to engage the pinions 16 with the racks 25 before the pinions 15 completely disengage the gear teeth 11b, thus preventing accidental rotational displacement of the intermediate sleeve assemblies from the positions in which they have already been set by the surcharge disks 11.

Also connected to the slide bar 66, near its forward end, is a lever 70 (Fig. 1) which upon advance of the bar 66 advances a second bar 71. Bar 71 is connected to means (not shown here but disclosed in my aforementioned Patent 2,120,373) for locking a ratchet disk 72 fixed to the weight shaft (not shown) of the weighing means in an even pound load position corresponding to the weight of the parcel for which the parcel postage is to be computed. Upon the locking of ratchet disk 72 in load position, means (not shown) are set in operation for automatically setting the value disks 10, under control of the weighing mechanism, in a rotative position corresponding to the locked load position of the ratchet disk 72. Upon disks 10 being arrested in the load position, means (not shown) are operated to energize a clutch solenoid 74 (Fig. 1). The clutch solenoid thereupon rocks a latch 75 downwardly, releasing a detent 76 for clockwise rocking by a spring 77, causing the detent to withdraw from a clutch dog 78, which thereupon engages a driving ratchet clutch disk 79. Disk 79 is driven by the motor which has already been set in operation, as explained above. Clutch dog 78 is bodily carried by a driven clutch disk 80 (also see Fig. 7) and when dog 78 engages driving ratchet 79, the driven disk 80 is coupled to drive ratchet 79 for one revolution. Before the end of the revolution of the driven disk 80, the detent 76 is restored, solenoid 74 is deenergized, the clutch dog 78 is disengaged from driving ratchet 79, and the disk 80 arrested at the end of the revolution, as disclosed in detail in my Patent 2,120,373.

Referring to Figs. 1, 7, and 8, the driven clutch disk 80 is rigid with a gear 81 meshed with a pinion 81' on one end of a shaft 82, the other end of which has a pinion 83 meshed with a gear 84 fixed to the main cam shaft 40. Through this transmission, the revolution of clutch disk 80 effects a one-revolution cycle of cam shaft 40, and this cycle may be referred to as the main cycle (see Fig 2).

As indicated in Figs. 7 and 8, an arm 85 is carried by gear 81 to strike an arm 86, carried by a gear 87, at 90° of the main cycle. Gear 87 is an interrupted gear, having a smooth arc 87' initially in front of gear 80. When arm 85 of gear 81 strikes arm 86, the gear 87 is rotated to bring the teeth of gear 87 into mesh with gear 81, starting the meter cycle at 90° (see Fig. 2). Rotation of gear 87 continues till 310° of the machine cycle. Gear 87, through bevel gearing 88, rotates a cam shaft 89 (also see Fig. 1) for one revolution. Shaft 89, through gearing (not shown) effects one revolution of meter cam shaft 90 (Fig. 3). The purpose of initiating the meter cycle after the machine cycle has been already started is to permit the adding, computing section, including stepped cams 17, to be completely set before the meter parts begin to read out the setting of these cams 17.

*Operation*

To understand the mode of operation of the machine, assume that a surcharge of $1.23 is to be applied to a parcel, the parcel postage on which for a particular zone is $4.87. The operator effects the zone selection and places the parcel on the scale. Surcharge disks 11 have their gear portions 11b initially meshed with pinions 15 of the intermediate sleeve assemblies and the setting of these disks to the surcharge amount $1.23, through gear teeth 11b and pinions 15 sets the intermediate sleeve assemblies, including stepped cams 17, in accordance with the surcharge values. Thus, for the assumed surcharge of $1.23, the "3" step 17' of cam 17a of the cents order, the "2" step of cam 17a of the dimes order, and the "1" step of cam 17a of the dollars order are preliminarily selected by the surcharge means. The scale having come to rest under the weight of the parcel, the operator depresses control handle 65 (Fig. 1), as a result of which the following occur:

(1) Pinions 15 of the intermediate sleeve assemblies are lowered, preventing any change in their surcharge setting, and the pinions 16 are meshed with racks 25 to place the intermediate sleeve assemblies under control of the reading means.

(2) The parcel postage value disks 10 of the selected zone are set in load position in readiness to control the reading means. When set in load position, the cents disk 10—c according to the assumed example, of the parcel postage of $4.87 has a "7" step 10' in front of finger 26—c, the dimes disk 10—d has an "8" step in front of finger 26—d, and the dollars disk has a "4" step in front of its reading finger 26—D.

(3) The setting of these steps 10' in control positions initiates the main cycle (Fig. 2) during which the main cam shaft 40 makes one revolution.

Figure 2:
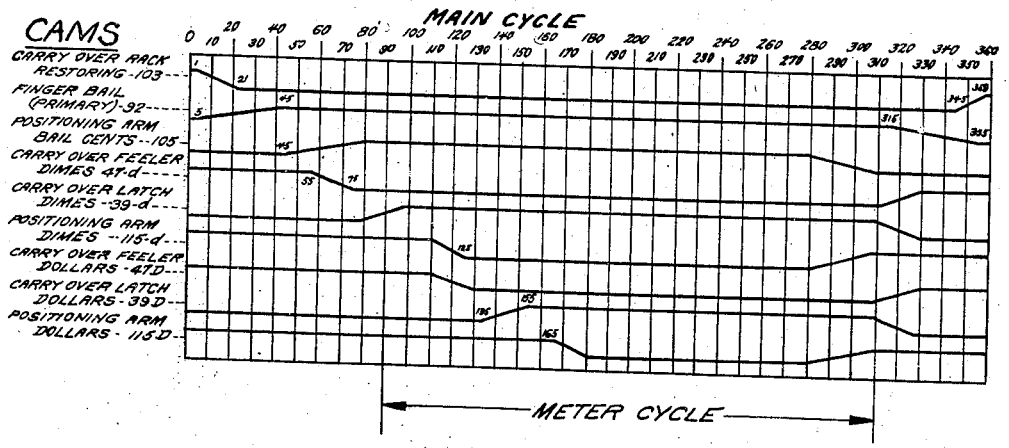
Fig. 2 is the timing chart.

On cam shaft 40 is a box cam 92 (see Figs. 4, 7, and 13) which coacts with an arm 93 fixed to a shaft 94 which rigidly carries a pair of bail arms 95 (also see Figs. 3 and 5), connected at their upper ends by a bail rod 96, initially abutting the front of portions 26' of the fingers 26 of the reading means. Coil springs 97, one between the rod 96 and each primary slide 27, urge the slides to follow the rod 96. Referring to Fig. 2, the box cam 92 acts between 0° and 45° of the main cycle to rock the bail rod 96 clockwise, causing primary slides 27 to follow until fingers 26 abut the parcel postage selector disk steps 10' in control positions, after which the springs 97 yield while the bail 96 continues to the end of its forward stroke. The engagement of fingers 26 with steps 10' arrests the primary slides 27 in differential positions corresponding to the values represented by the steps 10'.

While the primary slides 27 are moving to differential positions determined by engagement of the control steps 10' with fingers 26, the two restoring arms 33, one for each of the dimes and dollars order transfer racks 25, are permitted to rock counterclockwise to enable the transfer racks to advance with the primary slide. As shown particularly in Fig. 13, both restoring arms 33 are fixed to a shaft 100, carrying a crank arm 101 (also see Figs. 3, 4, and 5), connected to a link 102 which follows the periphery of a cam 103. As indicated in Fig. 2, cam 103 acts between 0° and about 21° of the main cycle to permit arms 33 to move to the right (Fig. 5), thereby releasing racks 25 of the dimes and dollars orders for a half tooth movement forwardly relative to their primary slides 27, as previously explained. This initial relative movement of racks 25 of the dimes and dollars orders of primary slides 27 is terminated when their tabs 25' (Figs. 5, 6, and 9) engage shoulders 34' of latches 34 carried by the same orders of primary slides.

In the example of a parcel postage charge of $4.87, the disks 10 will stop the primary slides 27 of the dollars, dimes, and cents orders after they have moved, respectively, four, eight, and seven steps. The racks 25 of the primary slides have moved bodily along with the slides and through engagement with pinions 16 have rotated the dollars, dimes, and cents orders of cams 17, in a counterclockwise direction (Figs. 3 and 5) through four, eight, and seven steps respectively. In addition, each primary slide has a zero take-up movement of half a step which is communicated to their respectively associated cams 17. Preliminarily, a surcharge value of $1.23 has been set up, advancing the dollars, dimes, and cents orders of cams 17 counterclockwise, one, two and three steps respectively. Thus at the end of the reading movement of the primary slides timed by cams 92, the cents order of cam 17 will have been rotated counterclockwise a total of ten and a half steps, consisting of the three surcharge steps, the half step take-up, and the seven parcel postage read-out steps. This brings the "0" step 17' of the portion 17b of cents order cam 17 into the control position in front of stud 52 of the cents order meter 53. The dimes order cam at the end of the reading movement of the dimes primary slide 27 will have been rotated counterclockwise a total of eleven steps, due to the surcharge advance of two steps plus the eight steps of parcel postage read-out movement of the dimes order slide, plus the half-step take-up of the primary slide, and the half-step take-up of the rack 25—d. Initially, as previously explained, the dimes order cam 17 has its "0" step of portion 17a one-and-a-half steps behind the control position which is in front of stud 52 of the dimes meter slide. Thus, eleven steps of advance of the cam 17—d will bring the "0" step of cam portion 17b one-half step behind control position. Similarly, the dollars order of cam 17, due to the surcharge advance of one step, the parcel postage read-out of four steps, and the take-up movements of one step, will have its "5" step 17' a half step behind the control position. These operations will all have been completed at 45° of the main cycle, by which time the cams 92 and 103 have completed their forward operations (as distinct from the restoring operations). The cents order cam 17b now has its "0" step in control position, the dimes order cam 17b has its "0" step one-half step behind the control position, and the dollars cam 17a has its "5" step one-half behind control position.

The next action which takes place is the differential positioning of cents order slide 53 under control of "0" step 17' of cam 17b. This positioning is done under control of a box cam 105 on main cam shaft 40 (see Figs. 3 and 4). Box cam 105 coacts with a follower roller 106 on a follower 107 pivoted to a crank arm 108 of a shaft 109 to which bail arms 110 are fast. A bail rod 111, connecting the bail arms 110, abuts the front of a cents order positioning arm 112—c and is connected thereto by a spring 113 which urges the positioning arm to follow the bail rod. The upper end of arm 112—c is provided with a stud 112' located in a slot 114 in the cents order meter slide 53—c. Between 45° and 80° of the main cycle (see Fig. 2), cam 105 moves follower 107 to the right (Fig. 3), rocking bail rod 111 clockwise, which through spring 113 yieldingly draws positioning arm 112—c to the right. The arm 112—c, in turn, moves meter slide 53—c to the right until its pin 52 engages a step 17' of cam 17 of the cents order intermediate sleeve assembly. According to the assumed example, a "0" step of the cents order cam portion 17b is now in control position, so that cents order slide 53 is arrested in "0" position, while bail rod 111 completes its forward stroke, spring 113 yielding to permit arm 112—c and connected meter slide 53—c to be stopped in differential position while the bail rod completes its forward stroke.

As the cents order intermediate sleeve assembly was moved through ten steps, resulting from the addition of the surcharge value of "3" to the parcel postage value of "7", the cents order transfer disk 18 moved its lower lobe 18b in front of lug 45' of transfer feeler 45. This action was completed at 45° of the main cycle due to operation of cam 92. At 55° of the main cycle, the carry feeler cam 47—d (see Fig. 6) of the dimes order starts to release its follower 44 for downward movement under the influence of spring 46 connected to associated carry-over feeler lever 45. Lever 45 now rocks counterclockwise (Fig. 6) until its lug 45' engages the periphery of lobe 18b of the cents order. As lever 45 moves counterclockwise, its pin 49 in conjunction with pin 43 (connecting levers 44 and 45) depresses intermediate link 42 of the dimes order. The link 42, through coaction of slot 42' with pin 35', rocks transfer pawl 35 of the dimes order downwardly, lowering its shoulder 35a out of the path of the vertical front edge of lug 25a of the dimes rack 25. This action is completed at 75° of the main cycle (see Fig. 2). At 80° of the main cycle, the carry over latch cam 39—d of the dimes order (see Fig. 5) starts moving the associated follower 38 downwardly which, through coaction of slot 38' with pin 37, rocks latch 34 of the dimes order downwardly. As a result, shoulder 34' is withdrawn from tab 25' of the dimes rack 25, permitting spring 31 to move the dimes rack forwardly relative to the dimes primary slide 27. Further, since the transfer operation from the cents order has already resulted in fully lowering the shoulder 35a of the dimes transfer pawl 35, out of the way of lug 25a of the dimes rack 25, the spring 31 will move the dimes rack forwardly relative to its primary slide to the limit permitted by the length of slots 30 of the primary slide. The dimes rack 25, due to its release by arm 33 has previously moved forward relative to its primary slide a half tooth step. The further advance of rack 25—d to the limit permitted by slots 30 of the primary slide equals one-and-a-half steps. Since the dimes order cam 17b at the end of the reading and surcharge operations was one half step behind the control position, as previously explained, the further advance of dimes order rack 25 through one and a half steps brings the "1" step 17' of cam portion 17b of the dimes order to the control position in front of slide 52 of the dimes order meter slide 53—d. Thus, the dimes surcharge setting of "2", plus the parcel postage read out of "8", plus the transfer of "1" from the cents order, has resulted in moving the "1" step of cam 17b of the dimes order to the control position. In the absence of the "1" transfer from the cents order, the "0" step of dimes order cam 17b would have been in control position. This is because if the cents order intermediate sleeve assembly had not passed from the "9" to the "0" position, the high lobe 18a of its transfer cam 18 would have stopped movement of levers 44 and 45 (see Fig. 6), and such movement would have been insufficient to cause link 42 to lower shoulder 35a of pawl 35 of the dimes order out of the way of lug 25a of the dimes rack 25—d. Consequently, upon release of dimes order latch 34 from tab 25' of rack 25—d, the latter would have moved forwardly relative to its primary slide only half a step before being stopped by engagement of lug 25a with shoulder 35a of pawl 35. This half step movement merely would have brought the "0" step of cam 17b of the dimes order to the control position. However, due to the transfer of "1" from the cents order, in the assumed example, the "1" step of dimes order cam 17b is now, at the end of the action of cams 47—d and 39—d, in the control position. This setting of the dimes order cam is completed at about 98° of the cycle (see Fig. 2, fifth cam line.)

The position of the dimes order cam 17 may now be read out by the dimes order meter slide 53—d. This is done under control of a cam 115—d (see Figs. 4, 5, and 7) on cam shaft 40. Referring to Fig. 5, cam 115—d is followed by a link 116 pivotally connected to the dimes positioning arm 112—d which is connected at its upper end to the meter slide 53 of the dimes order. At 110° of the main cycle (see Fig. 2), the cam 115—d permits link 116—d to move to the right (Fig. 5), causing positioning arm 112—d and slide 53—d to move similarly, the movement of these parts being yieldingly effected by a spring 113—d between cents positioning bail rod 111 (previously advanced) and the dimes positioning arm 112—d. The meter slide 53—d moves to the right until its stud 52 is stopped by engagement with the "1" step of dimes order cam 17b.

When the dimes order intermediate sleeve assembly moved through the "9" to "0" position, its transfer disk 18 placed its lower lobe 18b in front of the lug 45' of the dollars order transfer feeler 45. After the dimes order intermediate sleeve assembly has been set to the "1" position, the cam 47—D (Fig. 11) of the dollars order acts between 110° and 130° of the main cycle to permit the associated feeler 44 to descend and lever 45 to rock counterclockwise. Consequently, the pawl 35 of the dollars order is moved out of the way of the lug 25a of the dollars rack 25. This action is completed at 130° (see Fig. 2). The next action is under control of the dollars order cam 39—D (Fig. 10). At 135°, the cam 39—D lowers its follower 38 to cause release of latch 34 of the dollars order from tab 25' of the dollars rack 25. The dollars order rack 25 thereupon advances to its limit relative to the dollars primary slide 27—D and during this advance moves one-and-a-half steps. At the end of the surcharge and parcel postage reading operations, the step "5" of cam 17a of the dollars order was half a step behind the control position, as explained above. The further one-and-a-half steps advance of rack 25—D brings the "6" step of the cam 17a of the dollars order to control position. This action is completed at 155° of the main cycle. At 165°, a cam 115—D (Fig. 12) causes a link 116—D and a connected positioning arm 112—D to move to the right. Arm 112—D is connected to the dollar meter slide 53—D, and as a result this meter slide moves to the right until it is arrested by the "6" step of the cam 17a of the dollars order.

In above manner, the surcharge and parcel postage values have been added by the computing means which comprises the intermediate sleeve assemblies, and meter slides 53—c, d, and D have been differentially positioned in accordance with the total of the surcharge and parcel postage values, which in the assumed example is $6.10. In a manner explained before and also described in detail in my Patent 2,120,373, the positions of the meter slides 53 are converted into settings of the type wheels 58 to print the total of surcharge and parcel post values and into entries of the total into the adding register and the subtracting register B.

It may be noted that the machine may be used merely to print and register a surcharge value by leaving the scale unit in zero load position. Also, the machine may be used merely to print and register the parcel postage by leaving the surcharge disks 11 in zero positions.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described; a pair of sets of multi-order value selectors, a multi-order value computing means including in each order first and second similar value representing portions, each portion with differentially disposed edges representing all the different values of the order, means connecting one set of selectors to the computing means to advance the value representing portions in accordance with a selected value, connections between the other set of selectors and the computing means to advance the value representing portions additionally in accordance with the values selected by the latter set, the total advance of any lower order of the computing means when the sum of the values in the lower order selected by both sets of selectors fails to exceed the highest value in said lower order placing the first portion of the lower order of computing means with an edge thereof representing such lower order sum in control position and when such lower sum exceeds the highest value in the lower order placing the second portion of the lower order of computing means with an edge thereof representing the ultimate lower order value in control position, and transfer means effective when such second portion is placed in control position for advancing the next higher order of computing means an additional unit value amount.

2. In a machine of the class described; a set of multi-order value selecting members operable in accordance with a variable and having stepped edges representing values in each order, another set of separately, manually settable multi-order value selectors, multi-order value representing means, connections between the value selectors and the value representing means for advancing the latter according to a selected value, multi-order reading devices movable to engage the stepped edges of said members corresponding to the value for which said members have been set and arrested by said edges after differential movements corresponding to the latter value, connections between the reading devices and the value representing means for transmitting the differential movements of the reading devices to advance the value representing means additionally to their previously mentioned advance, and carry-over means to cause carry-over advance to an order of the representing means when the preceding order exceeds its capacity, whereby the representing means are given a total advance under control of the two value selecting sets equivalent to the sum of the values selected by both sets.

3. In a machine of the class described; a set of manually settable denominational orders of value selectors, a set of automatically settable denominational orders of value selectors, denominational orders of computing means, connections between the computing means and the manually settable selectors for differentially operating the computing means in accordance with the value selected by the latter selectors, cyclically operating means, means operable after the computing means has been operated by the manually settable selectors for initiating a single continuous cycle of the cyclically operating means and simultaneously disabling the aforesaid connections to render the manually settable selectors ineffective to operate the computing means after the cycle has been initiated, reading devices operated by the cyclically operating means during the cycle for reading out the value selected by the automatically settable selectors and having means for operating the computing means to effect additional differential operation of the computing means in accordance with the value selected by the automatically settable selectors, carry-over means for causing carry-over operation from a lower to the next higher order of computing means when the lower order exceeds its capacity, both differential operations and the carry-over operations of the computing means being equivalent to a single differential operation corresponding to the sum of the values selected by both sets of selectors.

4. In a machine for printing values, a set of manually settable denominational orders of value selectors, a set of automatically settable denominational orders of value selectors, denominational orders of computing means comprising in each order a stepped cam having steps differentially disposed and arranged to correspond to different values in the order, connections between the computing means and the manually settable selectors for differentially advancing the computing means according to a manually selected value, cyclically operating means, means operable after the computing means has been advanced by the manual selectors for initiating a single, continuous cycle of the operating means, reading devices operated by the cyclically operating means during said cycle for reading out the value selected by the automatically settable selectors and having means for advancing the computing means to effect additional differential operation of the computing means according to the value selected by the automatically settable selectors, and carry-over means for causing carry-over advance of a higher order of computing means when the differential advances of the next lower order exceeds the capacity of the lower order, both differential advances and the carry-over advance setting those steps of the computing means corresponding to the sum of the values selected by both sets of selectors in control positions.

5. In a machine of the class described, manually settable denominations of selectors for manually selecting values, a denominational set of selectors settable according to a variable for selecting values dependent on the variable, denominational orders of computing means, connections between the first-named selectors and the computing means for entering the manually selected values into the computing means, reading devices for reading out the variable dependent values and including feelers disengaged from the second-named selectors during the variable setting thereof and movable into engagement with the latter selectors after the setting thereof, cyclical operating means, means operable after the entry of the manually selected values into the computing means for initiating a single, continuous cycle of the operating means, means controlled by the operating means during the cycle for causing differential advance of the feelers into engagement with the second-named selectors according to the values variably selected by the latter, means in the reading devices controlled by said feelers according to their differential advance for entering the variable-dependent values into the computing means to be added to the entry of the manually selected values, carry-over means for causing carry-over entry into an order of the computing means when the preceding order exceeds its capacity, and means operated by the cyclically operating means during the same, said cycle for restoring the reading devices to initial position and thereby withdrawing the entry of the variable-dependent values from the computing means before the end of the cycle.

6. In a machine such as described, a set of manually settable denominations of value selectors, a set of denominational order value selectors settable, independently of the manual selectors, according to a variable, denominational orders of computing means including in each order differentially disposed control elements corresponding to different values in the order, connections between the computing means and the first-named selectors for directly advancing the orders of the computing means differentially to set elements thereof corresponding to manually selected values in control positions, devices for reading out the second-named selectors and having connections to the computing means for advancing the latter according to values selected by the latter selectors, carry-over means for causing a carry-over advance of an order of the computing means when the preceding order exceeds its capacity, cyclical operating means having a continuous cycle, means controlled by the operating means for operating the reading devices to read the second-named selectors and through the connections therefrom to the computing means to advance the latter differentially according to the values selected by the latter selectors, both differential advances of the computing means and the carry-over advance setting those elements corresponding to the sum of the values, selected by both sets of selectors, in control positions, either differential advance of the computing means, in the absence of the other differential advance, setting those elements corresponding to the values selected by one of the selector sets in control positions, and means operated by the cyclically operating means for sensing the elements in control positions, and whereby either manually selected values alone or values selected by the second-named selectors alone or their sum may be sensed during a cycle.

FREDERICK Q. RAST.